United States Patent [19]

Anton et al.

[11] Patent Number: 5,151,226
[45] Date of Patent: Sep. 29, 1992

[54] PROCESS OF MAKING CONTOURED VEHICLE INTERNAL PANELLING SUPPORTS

[75] Inventors: Rainer Anton, Bardowick; Dieter Harneit, Neetze, both of Fed. Rep. of Germany

[73] Assignee: Deutsche Fibrit Gesellschaft Abers & Dr Muller GmbH, Krefeld, Fed. Rep. of Germany

[21] Appl. No.: 626,601

[22] Filed: Dec. 11, 1990

Related U.S. Application Data

[63] Continuation of Ser. No. 515,547, Apr. 26, 1990, abandoned, which is a continuation of Ser. No. 393,638, Aug. 14, 1989, abandoned.

[30] Foreign Application Priority Data

Aug. 24, 1988 [DE] Fed. Rep. of Germany ....... 3828655

[51] Int. Cl.$^5$ ............................................. B29C 35/12
[52] U.S. Cl. .................... 264/25; 162/192; 162/224; 162/226; 219/10.41; 264/86; 264/119; 264/123; 264/126
[58] Field of Search ...................... 264/24, 25, 26, 86, 264/108, 119, 123, 126, 324; 425/174.8 R, 174.8 E; 162/192, 224, 226; 219/10.41

[56] References Cited

U.S. PATENT DOCUMENTS

| 3,533,906 | 10/1970 | Reiniger | 162/13 |
| 4,111,744 | 9/1978 | Reiniger | 264/25 X |
| 4,216,179 | 8/1980 | Lamberts et al. | 264/25 |

FOREIGN PATENT DOCUMENTS 3828655  5/1990  Fed. Rep. of Germany.

OTHER PUBLICATIONS

Trocknungstechnik, Zweiter Band, K. Kroll, Trockner und Trocknungsverfahren, 1978, pp. 406–422.
Taschenbuch der Spanplatten technik, Hans–Joachim Deppe et al., 2. uberarbeitete und erweiterte Auflage, 1977, p. 252.

*Primary Examiner*—Leo B. Tentoni
*Attorney, Agent, or Firm*—Sprung Horn Kramer & Woods

[57] ABSTRACT

The invention relates to a process for the production of contoured vehicle internal panelling supports having surfaces smooth on both sides on the basis of wood fibers by depositing an aqueous suspension of wood fiber (pulp) on a preforming screen, drying the preform, pressing and hardening. A deposited layer of fibers is dewatered to a residual water content of 20 to 25% by mass, related to the original quality of suspension, dried in an electric alternating field, then compression molded in a tool without a screen and hardened.

3 Claims, No Drawings

PROCESS OF MAKING CONTOURED VEHICLE INTERNAL PANELLING SUPPORTS

This application is a continuation of application Ser. No. 515,547, filed Apr. 26, 1990, now abandoned, which is a continuation of Ser. No. 393,638, filed Aug. 14, 1989, now abandoned.

FIELD OF THE INVENTION

The invention relates to a process for the production of contoured vehicle internal panelling supports having surfaces smooth on both sides on the basis of wood fibers by depositing an aqueous suspension of wood fiber (pulp) on a preforming screen, drying the preform, pressing and hardening.

BACKGROUND OF THE INVENTION

In the production of vehicle internal panelling supports the known wet pressing process has been widely adopted for the production of wood fiber moldings, as disclosed in "Taschenbuch der Spanplattentechnik" by H. J. Deppe, K. Ernst, 2 (1977), p. 252, published by DRW, Leinfelden. Main reasons have been the wide scope of freedom of design, with very deep deformations, and the achievable large size of parts. The last operating step represents a considerable disadvantage: relatively prolonged dry pressing in hot molding tools is required, since the water of the pulp must escape as water vapor through at least one perforated side of the screen, where the image of the screen structure is left on the finished part. No use can be made in the screen zone of pushers or similar ancillary devices such as are required, for example for producing certain edges or undercuttings, and quality-enhancing chemicals or auxiliaries can be added to the vat only to a limited extent, so as not to interfere with the vaporization of the water. Another disadvantage of a technical operating nature is that operations must be performed on "pressing lines", since intermediate storage of the preforms is impossible. Any article therefore always requires heavy use of machinery without guaranteed full utilization.

The first-mentioned disadvantage is avoided when using another process, disclosed in European patent 0 089 013 C2. The dry pressing process discloses therein allows the production on a major manufacturing scale of panelling supports smooth on both sides and the incorporation of pushers or the like in the molding tool. Its disadvantages are that in practice it limits the desirable degree of contour, more particularly as regards the depth of moldings required for modern internal panelling parts, for example, in dashboards or door linings in the motor vehicle industry. Moreover the preforms cannot be transported/stored in an operationally desirable manner.

It is an object of the invention to provide a process of the kind specified which retains all the advantages of the wet pressing process without the disadvantages inherent in the latter or in a dry pressing process, the production of the preforms being disconnected in space and time from the final pressing to produce the support, the result being the creation of new and optimum bases for economic operation.

SUMMARY OF THE INVENTION

According to the invention an aqueous suspension of wood fiber (pulp), which also may contain known chemicals and auxiliaries, is deposited on a screen and dewatered. The resulting preform being subjected to an electric alternating field for drying, for a period and intensively enough for the individual fibers to have acquired a moist, opened-up condition, while the or each bonding agent has not yet substantially started to react, although at the same time substantial excess quantities of moisture have been expelled, the residual water content being 20 to 50% by mass, referred to the original quantity of suspension. Then drying is performed in an electric alternating field, followed by compression molding in a tool without a screen and hardening.

All the known drying processes lead to concentration of energy on the surfaces of the parts, causing at those places defects such as burning, embrittlement, foaming, hardening, bubble formations, encrustations, etc., and moreover the parts must spend in the particular installation dwell times which can hardly be controlled in the course of operations. In contrast, the drying according to the information in an electric alternating field is free from these disadvantages.

The premold, then substantially dry, stackable, storable and highly flexible, is ready for the next operating step. The predried preform is inserted in a hot pressing tool, which has no screen but is formed with a number of vapour-relieving bores, and given a brief final pressing at relatively low pressure and an appreciably reduced temperature in comparison with the wet pressing process, a certain quantity of residual moisture being expelled. The or each bonding agent is hardened or converted to a temporary molten state.

The invention therefore relates to the economic production of mold-deposited vehicle internal panelling supports of mainly pulped wood fibers in short pressing times, quality-enhancing chemicals and auxiliaries being addable to the suspension of fibers to above an extent hitherto regarded as critical. The moldings are smooth on both sides. Use can be made of pushers or a multipart second tool half with reduced demands, for example, on movable components with regard to long-term temperature resistance and pressure absorption. This renders possible undercuttings on the finished part. Possible freedom of shaping is only slightly restricted constructionally. Moreover, the preforms can be stored and transported.

In a preferred embodiment, by the paper manufacturing method an aqueous vat is prepared on the basis of TMP (thermomechanical pulp) and/or CTMP (chemical TMP), as described on page 1884 of Vol. 2 of the "Encyclopaedia of Science and Technology", published by Moderne Industrie, Munich, and/or natural short fibers and/or commercially available cellulose fibers. Referred to this proportion of fibers, 5–40% by mass, preferably 7.5–30% by mass of thermoplastics are added, for example, thermoplastics selected from the group of polyolefins or polyamides, in the form of powders and/or fibers predominantly having a length of about 4–10 mm, in addition to non-melting fibers commercially available in the form of polyester, polyacrylonitrile, polyamide fibers and others, which do not increase the total proportion of foreign fibers over 40% by mass.

To this composition it is possible to add all other proven auxiliaries having a positive influence on the behaviour and properties of the suspension during molding, dewatering, predrying and pressing, and also on the behaviour and properties of the finished product during removal, storage and industrial application. These remain preserved to perform their action in the finished part, reduced by the calculable proportion removed by dewatering, since the hot pressing is no longer connected with a water discharge through screens.

The following are more particularly added: paper and/or nonwoven binders, if necessary with hardening/wetting agents and/or retaining and/or dispersing and/or hydrophobizing agents, and/or buffer substances and/or internal separating agents and/or flame protection agents and/or antioxidants and also dyestuffs and/or pigments and others.

The batch is diluted with water to a working consistency of 0.1-2.8% by mass, preferably 0.2 to 0.6% by mass, referred to its total quantity, disposed in known manner on a molding screen having the dimensions and shape similar to a vehicle door panelling, and subjected to a stream of cold or hot air at about 10-80 MPa for about 60-120 seconds for dewatering purposes. The resulting molding, about 12 mm in thickness, is removed with a residual water content of 20-50% by mass and dried in an industrial continuous high frequency furnace to 10-30% by mass, preferably 15-20% by mass, now referred to the proportion of natural fibers and then, either in the still warm condition at 100-330 MPa and, in dependence on the softening range of the added thermoplastics, pressed at 165° to 245° C. for about 35-50 seconds, or after storage, for example, for 10 minutes to about 330 hours pressed in the cold state for about 45-60 seconds to a wall thickness of about 2.0-2.5 mm and removed from the tool, which has a shape exactly corresponding to the door panelling and is formed with about 300 steam-relieving bores, referred to 1 m² of developed surface, having a diameter of about 1 mm.

The stability of dimensions and technical properties of finished parts produced by this preferred embodiment are always outstanding and reproducible.

The new possibilities opened up by the method of operation according to the invention are as follows: the final pressing times are substantially reduced in comparison with the prior art wet processes, the necessary press not being required to be coupled to the molding process either in space or time; undercuttings and two satisfactory sides can be produced; substantially more and different quality-enhancing auxiliaries can be introduced into the end product; and the technical demands made on the tools are lower and more economic, due to reduced temperatures and relatively low pressure, while at the same time the possible shaping of the vehicle internal panelling supports thus produced is almost unlimited in comparison with purely dry pressing processes.

Hitherto a technical prejudice existed to the effect that these aims could not all be uniformly achieved using deposited wood fiber pulps. It was furthermore assumed that screen moulds become stuck up and clogged when loaded by foreign fibers and chemicals, that no pushers could be incorporated, and that dry pressing times could not be further reduced. Neither did it seem possible so to dry preforms to close to the natural final moisture content that the bonding agents do not crack and no surface faults occur. It was always assumed that wet pressings would always have to be pressed immediately, while loose dry pressings must also be pressed exclusively dry, the dried preforms remaining flexible, storable and readily moldable to their final shape, and that dry pressing processes heavily limit freedom of shaping. Surprisingly all the prejudices have been simultaneously overcome by the invention, which uses a wet molding technique to produce a compact preform which can be handled and stored and pressed by a dry technique.

EXAMPLE

A 50 m³ pulp vat was operated in water with 0.52% of the following solids:

55 parts by weight coniferous timber TMP
5 parts by weight 10-20 mm jute fiber
5 parts by weight Canadian cellulose
20 parts by weight 10.6 mm polyacrylonitrile fiber
15 parts by weight 5-15 mm PP fibers
1.6 parts by weight PE wax
5.0 parts by weight carboxylated polyethylene in ammonia dipersion
1.0 part by weight alum.

After homogenization in a wet pressing installation, the whole was passed through a screen having substantially the shape of a door internal panelling support. When the resulting pulp deposit had reached a thickness of 12-14 mm, the operation was interrupted and the water drawn off, whereafter a stream of compressed air at a temperature of 140° C. was passed at 18 MPa through the layer of fibers for 60 seconds, the layer then being taken over by a supporting carrier and introduced into a continuous high frequency drier having an effective power of 60 kW. After 1 minute the residual moisture of the preform was 22% by mass and its average temperature 85° C.

The preform was then immediately pressed at 230° C. and 28 bar in a pressing tool which had precisely the contour of the door panelling supporting part and no screen side, but 240 gas-relieving bores. After 50 seconds the part was demolded, at which point it was stable in dimensions.

We claim:

1. A process for the production of a wood fiber-based contoured vehicle internal panelling support having surfaces smooth on both sides, consisting essentially of depositing onto a contoured preforming screen an aqueous suspension of wood fiber containing at least one bonding agent, dewatering the resulting preform to a residual water content of 20 to 50%, drying the preform in an electric alternating field at a temperature below the starting reaction temperature of the bonding agent to a residual moisture content in the range of 10 to 30% by weight of the wood fibers, then compression molding in a screenless tool, and hardening.

2. A process according to claim 1, wherein the drying in the electric alternating field is carried out to a residual moisture content in the range of 15 to 20% by weight of the wood fibers.

3. A process according to claim 1, wherein the dried preform is stored prior to compression molding.

* * * * *

UNITED STATES PATENT AND TRADEMARK OFFICE
CERTIFICATE OF CORRECTION

PATENT NO. : 5,151,226

DATED : September 29, 1992

INVENTOR(S) : Anton et al.

It is certified that error appears in the above-identified patent and that said Letters Patent is hereby corrected as shown below:

Title Page     [21] Appl. No.:    Delete " 626,601 " and substitute
                                                         -- 627,601 --

Signed and Sealed this

Twenty-fifth Day of January, 1994

Attest:

BRUCE LEHMAN

*Attesting Officer*     *Commissioner of Patents and Trademarks*